United States Patent
Bartosik

(10) Patent No.: US 12,014,168 B1
(45) Date of Patent: Jun. 18, 2024

(54) SYSTEMS AND METHODS FOR AUTOMATED MACHINE PATCHING

(71) Applicant: United Services Automobile Association (USAA), San Antonio, TX (US)

(72) Inventor: Shawn Kerrigan Bartosik, Helotes, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 17/364,217

(22) Filed: Jun. 30, 2021

(51) Int. Cl.
*G06F 9/44* (2018.01)
*G06F 8/658* (2018.01)
*G06F 8/71* (2018.01)
*G06F 9/48* (2006.01)
*G06F 9/50* (2006.01)

(52) U.S. Cl.
CPC .......... *G06F 8/658* (2018.02); *G06F 8/71* (2013.01); *G06F 9/4887* (2013.01); *G06F 9/5038* (2013.01)

(58) Field of Classification Search
None
See application file for complete search history.

(56) References Cited

U.S. PATENT DOCUMENTS

| | | | |
|---|---|---|---|
| 10,505,825 B1* | 12/2019 | Bettaiah | G06F 16/24578 |
| 11,354,150 B1* | 6/2022 | Guo | H04L 41/082 |
| 2009/0198801 A1* | 8/2009 | Waud | G06F 8/656 709/221 |
| 2010/0318391 A1* | 12/2010 | Gvirtsman | G06Q 10/06 705/7.39 |
| 2016/0103673 A1* | 4/2016 | Curran | G06F 8/658 717/168 |
| 2020/0004523 A1* | 1/2020 | Eroshkina | H04L 12/66 |
| 2022/0027861 A1* | 1/2022 | Colena | G06Q 10/1097 |
| 2022/0075613 A1* | 3/2022 | Ramachandran | G06F 9/45558 |

* cited by examiner

Primary Examiner — Wei Y Zhen
Assistant Examiner — Lanny N Ung
(74) Attorney, Agent, or Firm — Fletcher Yoder, P.C.

(57) ABSTRACT

Systems and methods for scheduling and deploying patches to electronic device assets are provided. A patch management system identifies scheduling for patching and causes a patch scripting service to apply patching tags to the electronic device assets. A patch deployment service deploys patches based upon the applied tags.

20 Claims, 17 Drawing Sheets

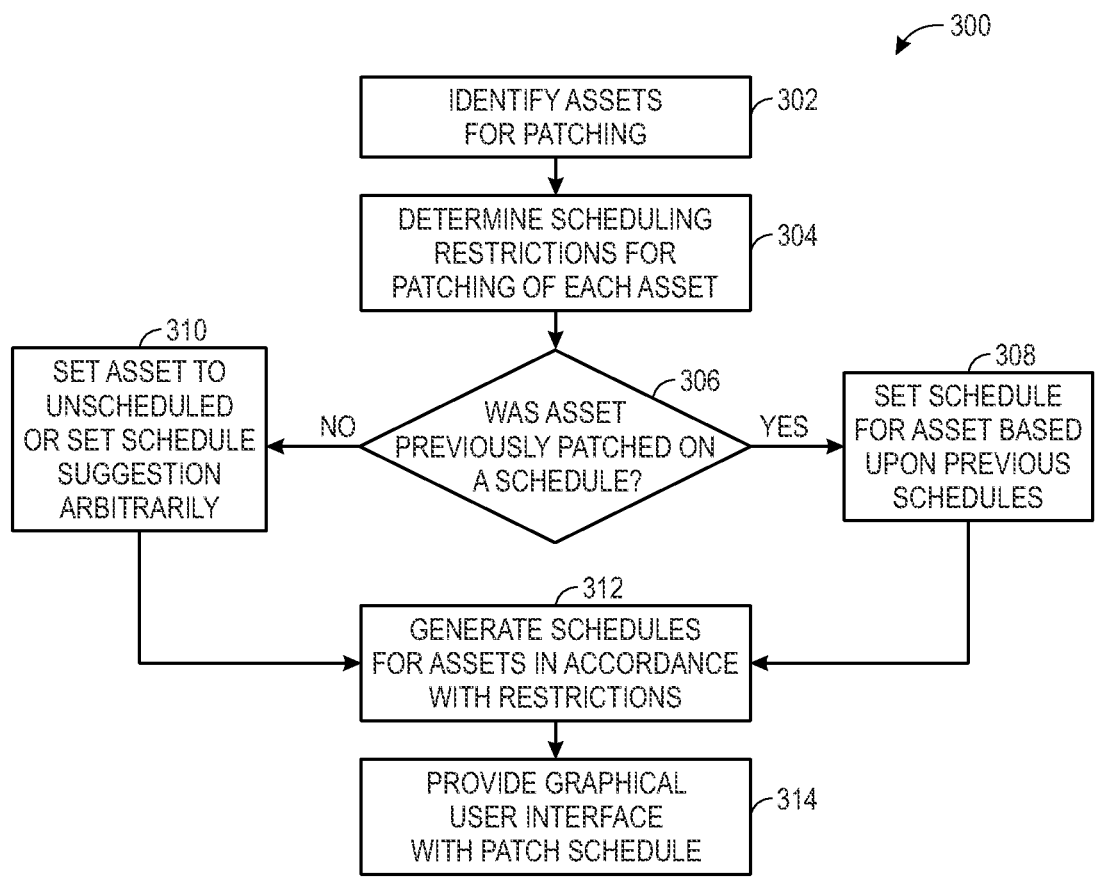
FIG. 3
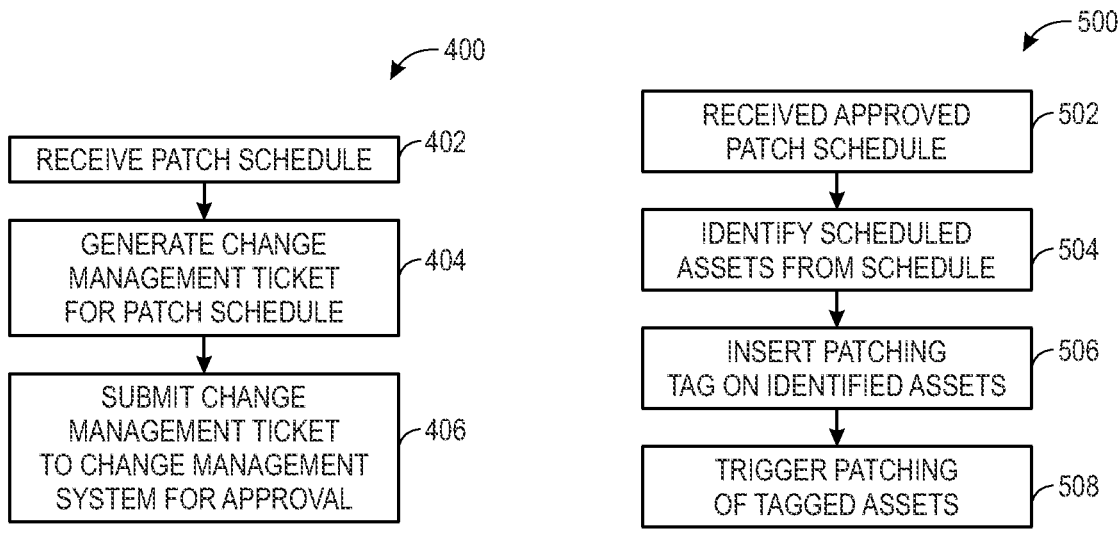
FIG. 4
FIG. 5

PATCHMAN

MSM Q1 2021
DEC. 31, 2020 - MAR 31, 2021

MY POOL SERVERS

NOT SCHEDULED (380) EXCEPTION TO PATCHING (870)

CONFIGURATION  SEARCH

SERVERS SELECTED 1   [SCHEDULE] [EXPORT]

| | SERVER NAME | OS | OS VERSION | CONTACTS | LAST PATCH DATE | SCHEDULE NOTES |
|---|---|---|---|---|---|---|
| ☐ | SERVER #1 | LINUX RED HAT | 6.10 | DATABASE_UDB | | 💬 |
| ☐ | dcr3813l | LINUX RED HAT | 6.10 | DATABASE_UDB | | 💬 |
| ☐ | SERVER #3 | LINUX RED HAT | 6.10 | DATABASE_UDB | | 💬 1 |
| ☐ | SERVER #4 | LINUX RED HAT | 5.11 | DATABASE_UDB.WEB_APPLICATION_PLATFORM_SERVICES | | 💬 |
| ☐ | SERVER #5 | LINUX RED HAT | 6.10 | DATABASE_UDB | | 💬 |
| ☐ | SERVER #6 | LINUX RED HAT | 7.8 | DATABASE_UDB.DATABASE_ORACLE | | 💬 |
| ☐ | SERVER #7 | LINUX RED HAT | 6.10 | DATABASE_UDB | | 💬 |
| ☐ | SERVER #8 | LINUX RED HAT | 6.10 | DATABASE_UDB | | 💬 |

ITEMS PER PAGE 50 ▾   1-50 OF 350

| PATCHMAN | | | CONFIGURATION | SEARCH |
|---|---|---|---|---|
| MSM Q1 2021 PATCH CYCLE<br>JAN 1, 2021 - MAR 31, 2021 | | | | |
| MY POOL SERVERS | | | | |
| NOT SCHEDULED (3) PENDING EXCEPTION (3) EXCEPTION TO PATCHING (54) | | | | |
| ☐ SERVER NAME<br>SERVER NAME | CONTACTS<br>CONTACTS | REQUESTED BY<br>REQUESTED BY | REQUESTED DATE<br>REQUESTED DATE | SCHEDULE NOTES |
| ☐ prodenccoetids17l | OPERATIONS_DEVELOPMENT | plx7448 | 1/12/21, 4:43 PM | 💬 |
| ☐ produdbgbl610lsjt | OPERATIONS_DEVELOPMENT | pls2147 | 1/13/21, 9:24 PM | 💬 |
| ☐ prodbic1wn118l | OPERATIONS_DEVELOPMENT | plx7448 | 1/12/21, 7:54 PM | 💬 |

*FIG. 15*

| PATCHMAN | | CONFIGURATION | SEARCH |
|---|---|---|---|

SEARCH BY SERVER

SERVER NAME:
prodetildsoper21l

PRODETILDSOPER21L (EXCEPTION TO PATCHING - APPROVED BY PLK4777) ON: 12/17/2020 8:48 AM — 1604

1602

[SEARCH]

OS: LINUX RED HAT
OS VERSION: 6.0
CONTACT: Midrange_Server

| WINDOW ↓ | PATCH PATCH NAME |
|---|---|
| EXCLUDED | FEB 2031 TEST CYCLE NEW |
| EXCLUDED | FEB 2031 TEST CYCLE NEW |
| EXCLUDED | JAN 2031 TEST CYCLE |
| EXCLUDED | MSM Q1 2021 PATCH CYCLE (CURRENT CYCLE) |

SYSTEMS AND METHODS FOR AUTOMATED MACHINE PATCHING

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

As electronic services become increasingly utilized in the connected world, an exponential increase in electronic devices have been introduced into Information Technology (IT) systems to facilitate these services. The increase in electronic services has made data stored within these electronic devices more and more valuable. To sustain these electronic devices, when functional faults and/or security faults are discovered, software updates (e.g., "patching") may be introduced to the electronic devices. Unfortunately, however, this patching process may be quite complex as there may be numerous systems within different organization of an enterprise that may require patching. Further, the patching may cause downtime and certain electronic devices may have dependencies on other electronic devices.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 is a flowchart, illustrating a process for scheduling IT asset patching using the patch management service of FIG. 2, in accordance with certain embodiments described herein;

FIG. 4 is a flowchart, illustrating a process for creating change management tickets using a patching schedule generated by the patch management service of FIG. 2, in accordance with certain embodiments described herein;

FIG. 5 is a flowchart, illustrating a process for triggering patching via patch tag insertion based upon a patching schedule generated by the patch management service of FIG. 2, in accordance with certain embodiments described herein;

FIG. 6 illustrates a graphical user interface (GUI) of the patch management service that facilitates patch scheduling, in accordance with certain embodiments described herein;

FIGS. 7A-C illustrate a progression of scheduling a patch of an asset via a GUI, in accordance with certain embodiments described herein;

FIG. 10 illustrates a maintenance window search to identify patches within a particular specified maintenance window that is facilitated via a GUI, in accordance with certain embodiments described herein;

FIG. 12 illustrates a GUI of a change management system, launched from the GUI of FIG. 11, illustrating a change management ticket that is generated for the particular specified maintenance window, in accordance with certain embodiments described herein;

FIGS. 13A and B illustrate a GUI progression for rescheduling patching of a particular asset, in accordance with certain embodiments described herein;

FIG. 15 illustrates a GUI that facilitates acceptance of exceptions for patching during a particular patching cycle, in accordance with certain embodiments described herein; and FIG. 16 illustrates a GUI that provides an indication of an approved exception for patch scheduling for a particular asset, in accordance with certain embodiments described herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
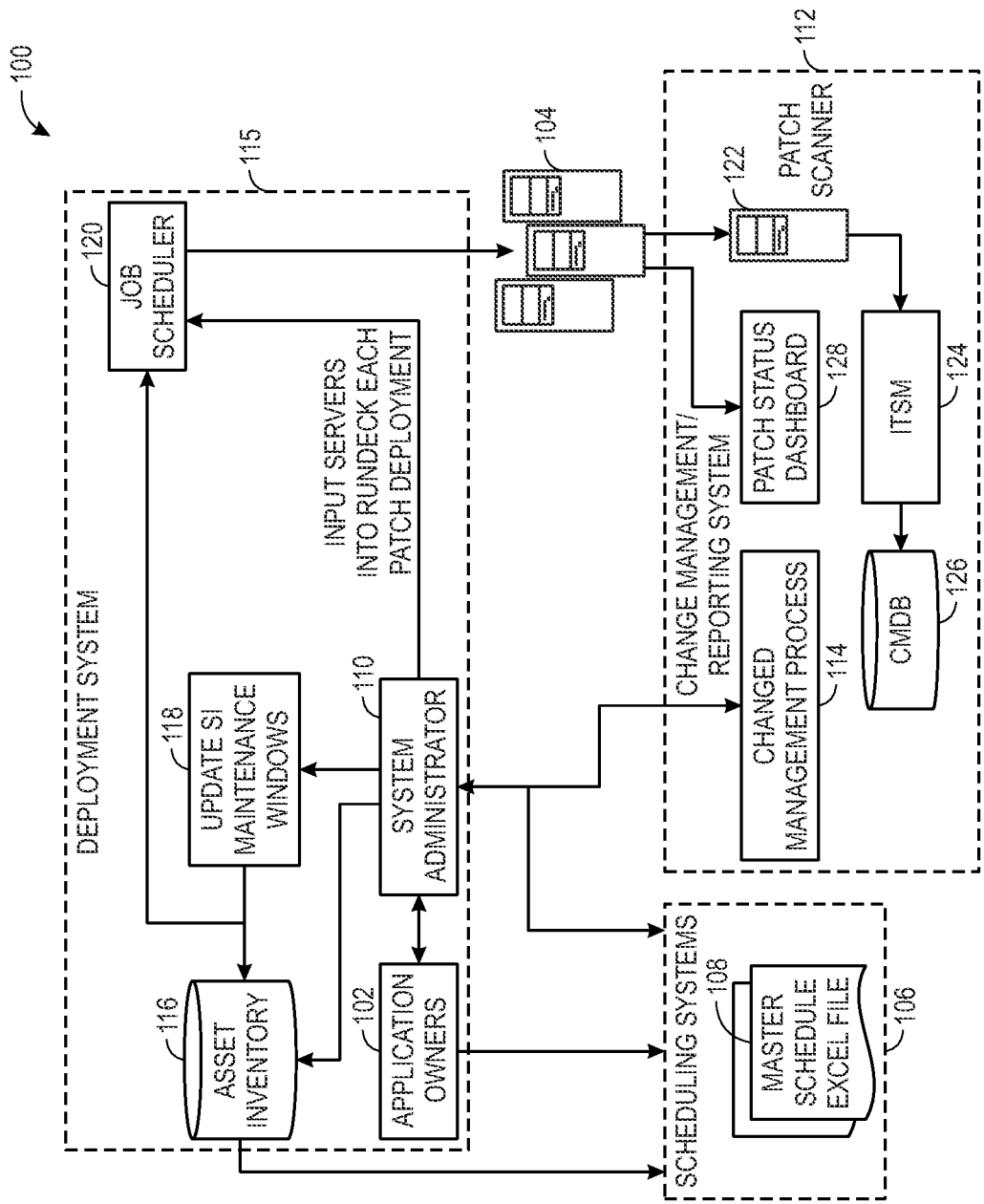
FIG. 1 illustrates a system for traditional scheduling of IT asset patching, in accordance with certain embodiments described herein.

FIG. 1 illustrates a system 100 for traditional scheduling of IT asset patching, in accordance with certain embodiments described herein. Application owners 102 may request patch scheduling of assets 104 via one or more scheduling systems 106. For example, as illustrated in FIG. 1, the scheduling systems may include electronic documents 108 (e.g., Excel files) that provide scheduling details regarding the patch scheduling of the assets. The application owners 102, in conjunction with instruction from the system administrators 110 may adjust scheduling of the patching of the assets via the scheduling systems 106. The system administrators 110 may access the schedule vial the scheduling systems 106 and may generate a change management based upon the schedule, via the change management/reporting systems 112 (e.g., via a change management process 114).

The system 100 may also include deployment systems 115, tasked with deploying patches in accordance with the patching schedule. To ensure that all assets are appropriately patched, an asset inventory 116 may be maintained (e.g., by the system administrators 110). The asset inventory 116 may be fed into the scheduling systems 106, such that all assets in the asset inventory 116 may be indicated as needing to be scheduled (or indicated as already scheduled). Additionally, particular asset window availability 118 may be defined. The asset window availability may provide specific time windows in which a particular patch may be applied.

Once the patching schedule for the asset inventory 116 is generated (e.g., via the scheduling systems 106), the system administrators 110 may input jobs (instructions to patch particular assets at particular scheduled times) to a job scheduler 120, which will run the jobs on the assets 104.

The change management/reporting systems 112 may include a patch scanner 122 that may scan the assets 104 to identify whether patches have indeed been implemented in accordance with the schedule. The patch scanner 122 may feed results to an IT Service Management System (ITSM) 124, which may update a configuration management database (CMDB) 126 with an updated patching status of the assets 104. Further, a patching status dashboard 128 may provide a graphical user interface (GUI) that presents a status of patching completion for the assets 104.

Due to the security vulnerabilities that may be remedied by the patching, it may be crucial that patching occur in a very efficient manner (e.g., to avoid delay in remedy of the security vulnerabilities). Indeed, many IT teams are governed by service level agreements (SLAs) and/or regulatory agencies to implement patching within a particular prescribed time threshold. Unfortunately, the system 100 may not scale with the increasing number of assets 104 found in certain IT systems, causing SLAs and/or regulations to be breeched. In particular, as the number of assets increase, increased scheduling conflicts may arise, causing delays in implementing the patches. Further, inputting the jobs to the job scheduler 120 can be a very time-intensive task that increase with the addition of new assets 104. Accordingly, a scalable patching solution is described with respect to system 200 of FIG. 2.

Figure 2:
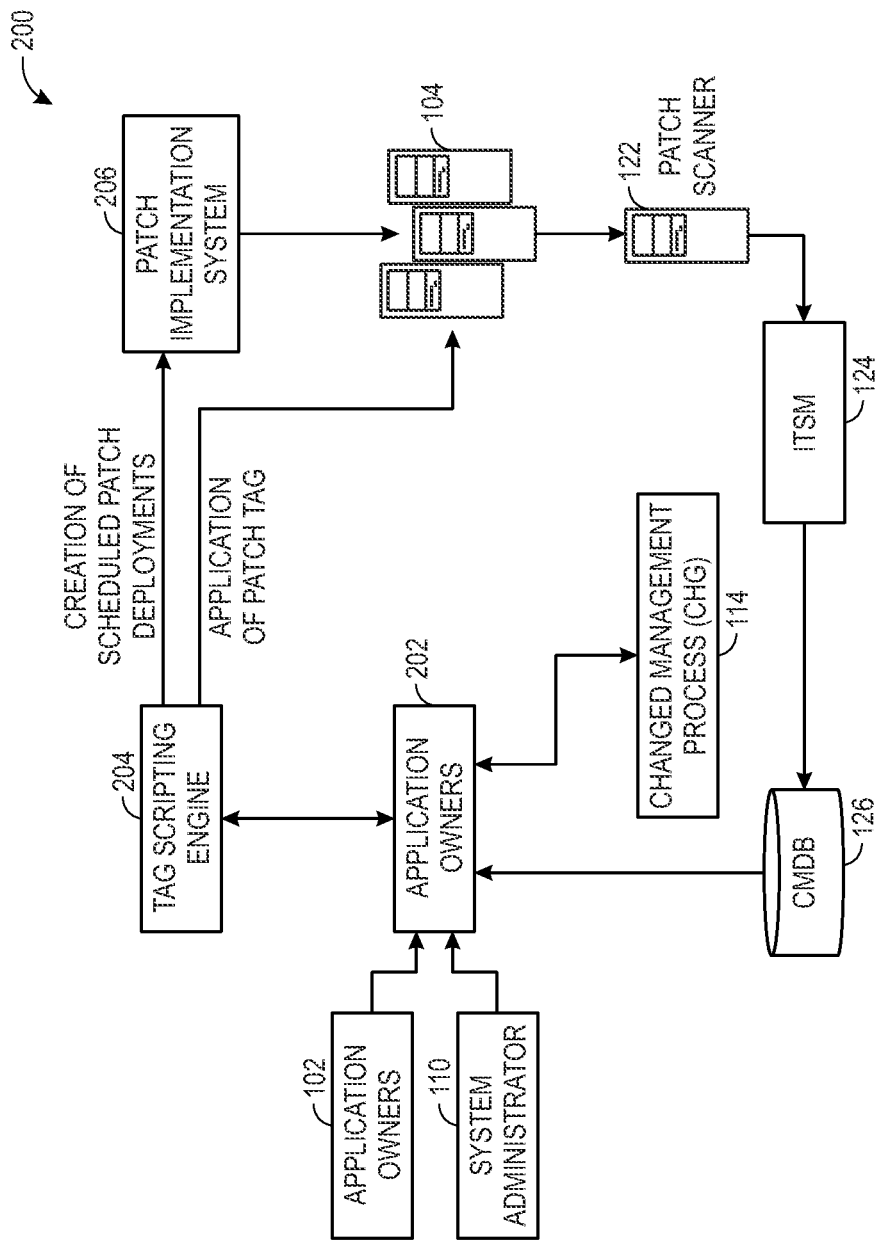
FIG. 2 illustrates a system that includes a patch management service that utilizes patching tags to facilitate asset patching, in accordance with certain embodiments described herein.

The system 200 of FIG. 2 includes a patch management service 202 that facilitates scheduling of patches for the assets 104 in an efficient manner. The patch management service 202 provides a graphical user interface (GUI) that enables the application owners 102 and system administrators 110 to efficiently work together to create a conflict-free patching schedule in a centralized location. In contrast to system 100, system 200 may directly import an asset inventory from the CMDB 126, rather than relying on the separately maintained asset inventory 116 of FIG. 1. This may create several efficiencies. First, by pulling from the CMDB 126 directly, increased accuracy of actual assets needing patching may be provided. For example, the ITSM 124, via the CMDB and the patch scanner 122, may be aware of all assets and their patching status within the IT environment. The asset inventory 116 of FIG. 1, if not maintained frequently and accurately may include inconsistencies with the CMDB 126, causing certain assets 104 to be missed in the patch scheduling. Second, as illustrated in FIG. 2, with respect to system 200, there is no dependency on system administrators 110 maintaining the asset inventory 116 of FIG. 1. This frees up the system administrators 110 to complete more value-added tasks.

The patch management service 202 may provide recommended scheduling for particular assets 104 based upon certain criteria. Further, the patch management service 202 may enable system administrators to efficiently view scheduled assets, assets associated with particular scheduled patching windows, etc. Application owners 102 are provided the option to set particular patching times (e.g., time windows) and/or request patching exceptions. These features are discussed in more detail below.

As the patching schedules are completed, the patch management service 202 may automatically create change requests for a change management process 114. For example, the change management process 114 may require that a change management request be submitted and approved prior to patching of assets. The completed schedules may be used to populate this change request automatically, supplying asset identifiers (e.g., machine names) and requested patching time/downtime (e.g., based upon the scheduled time window ascribed to the particular asset). Once approved via the change management process, the completed schedule may be finalized (e.g., frozen and approved).

At a periodic interval, a tag scripting engine 204 accesses finalized schedules via the patch management service 202 (e.g., via an application programming interface (API)). For example, each day, the tag scripting engine 204 may pull that day's finalized patching schedule. The patching schedule may provide particular assets 104 and their scheduled patching windows (e.g., a range of time when patching implementation is authorized for particular assets 104). Upon receiving the patching schedule, the tag scripting engine 204 may generate and apply tags to assets indicated in the schedule. In some embodiments, the tags indicate particular patching windows ascribed to the particular assets 104. For example, if a first and second machine are ascribed a $1^{st}$ window and a third and fourth machine are ascribed a $2^{nd}$ window, a first tag, indicative of the $1^{st}$ window may be applied to the first machine and the second machine and a second tag, indicative of the $2^{nd}$ window, may be applied to the third machine and the fourth machine. The tag scripting engine 204 may also send an indication of the tag and a corresponding time window for implementation of patching to a patch implementation system 206. In this manner, the patch implementation system 206 may efficiently apply patches to assets 104 during ascribed patching windows, by identifying when a patching window occurs and implementing patching for all assets 104 that have a patching tag matching the current patching window. This provides a very efficient solution for implementing patching that guarantees patching of machines during ascribed patching windows, while also ensuring that SLAs and/or regulations are met.

As with system 100, the patch scanner 122 may scan assets 104 for patch implementation completion. A patching status may be provided to the ITSM 124, which may update information in the CMDB 126, indicating the updated patching status.

FIG. 3 is a flowchart, illustrating a process 300 for scheduling IT asset patching using the patch management service of FIG. 2, in accordance with certain embodiments described herein. The process 300 begins with identifying assets to be patched (block 302). For example, an electronic inventory of IT assets may be maintained and used to identify electronic devices to be patched.

Next, any scheduling restrictions for patching each of the identified assets is determined (block 304). For example, IT personnel or other authorized individuals may utilize a restrictions GUI that enables patching restriction rules to be implemented for particular assets. For example, patching may be restricted to certain time periods (e.g., $1^{st}$ and $3^{rd}$ Saturday of the month) and/or may provide specific rules for assets having certain common features (e.g., all Linux machines are restricted to patching in odd weeks, while all Windows machines are restricted to patching in even weeks). Further, other restrictions, such as a maximum number of allowed assets for patching at a particular time may be set.

Once the restrictions are identified, in some embodiments, a determination is made as to whether the particular assets to schedule were previously patched on a schedule (decision block 306). As mentioned herein, in some embodiments, if an asset was previously scheduled, the patch management service 202 may suggest and/or automatically set scheduling for the asset based upon a previous patching schedule of the asset (block 308). If the asset was not previously scheduled and/or the embodiment of the patching management service 202 does not schedule patching based upon previous patch scheduling, the asset may be set to unscheduled or may provide an arbitrary suggestion for scheduling of patching of the asset (310).

Users of the patch management service 202 may select and/or confirm schedules for authorized assets and subsequently a schedule for all the scheduled assets is generated (in accordance with the identified restrictions) (block 312). Once the schedule is generated, a graphical user interface (GUI) may provide the patching schedule for the assets, as will be described in more detail below (block 314).

Once the patching schedule is generated, additional IT processes may be automatically triggered. For example, FIG. 4 is a flowchart, illustrating a process 400 for creating change management tickets using a patching schedule generated by the patch management service of FIG. 2, in accordance with certain embodiments described herein. The process 400 begins with receiving the patching schedule (block 402). For example, as mentioned above with respect to FIG. 3, a patching schedule may be generated based upon inputs by authorized individuals into a GUI, where the scheduling is in accordance with any scheduling restriction rules that may be in place.

In response to receiving the patch schedule, one or more change management tickets may be generated for the patch schedule. For example, as may be appreciated, many IT enterprise policies require change management authorization, which is facilitated by the creation of change management tickets that are authorized by IT personnel. Ticket generation has traditionally been a very tedious manual process that is quite error prone, relying on human accuracy for completion. However, here, the patch schedule may be provided in a computer-readable format (e.g., XML), which may be parsed and interpreted to automatically generate new change management tickets. For example, the patch schedule may be traversed to identify sets of assets that occur within patching windows. For each patching window, a new change management ticket may be generated and assets associated with that change management window may be added as assets that will be changed during the particular change management window.

Once generated, the change management tickets may be submitted for approval through the change management system (block 406). For example, upon submission of the change management ticket, an approval request may be provided to particular approving entities for approval of the change management request represented by the ticket. Because the assets scheduled for the particular change management window are provide in the ticket, the approver may quickly reference the entire patching plan (e.g., assets proposed for change) for the particular change management window. The approver then has the option to approve, approve with conditions, and/or deny approval for the requested change.

Once the patching schedule is approved, the patches may be automatically applied in accordance with the approved patching schedule. FIG. 5 is a flowchart, illustrating a process 500 for triggering patching via patch tag insertion based upon a patching schedule generated by the patch management service 202, in accordance with certain embodiments described herein. The process 500 begins with receiving the approved patch schedule (block 502). For example, as mentioned above, the change management ticket approval process may result in an approved patching schedule that may be generated in a computer-interpretable format.

Upon receiving the approved patching schedule, the assets approved for a particular patching window to be implemented are identified (block 504). For example, as mentioned above, the approved patching schedule may be traversed for a node representative of the particular patching window to be implemented. Sub-nodes associated with the node may contain an indication of the assets approved for patching during the particular patching window.

A patching tag may be provided/inserted at the assets (block 506). For example, a computer-interpretable tag may represent a particular patching window or other data that can be used to identify the asset as one that is approved for patching during the particular patching window.

Upon the particular change management window occurring, patching may then be triggered for assets that have the inserted tag (block 508). For example, a script may be executed by a patching service that indicates that all assets having the particular tag associated with the change management window should commence, causing the automated patching process to begin.

Turning now to a discussion of the graphical user interface of the patch management service 202, FIG. 6 illustrates a graphical user interface (GUI) 600 of the patch management service 202that facilitates patch scheduling, in accordance with certain embodiments described herein. The GUI 600 provides a selectable affordance 602 that enables display of assets (e.g., servers or other machines) that are not currently scheduled, providing an easy way to identify assets that still need to be scheduled. Upon selecting affordance 602, a list 604 of selectable assets that are not currently scheduled for patching is provided. As indicated by selection 606, assets in the list 604 may be selected. Upon selection, the affordance 608 allows for scheduling of the selected assets.

Figure 7A:
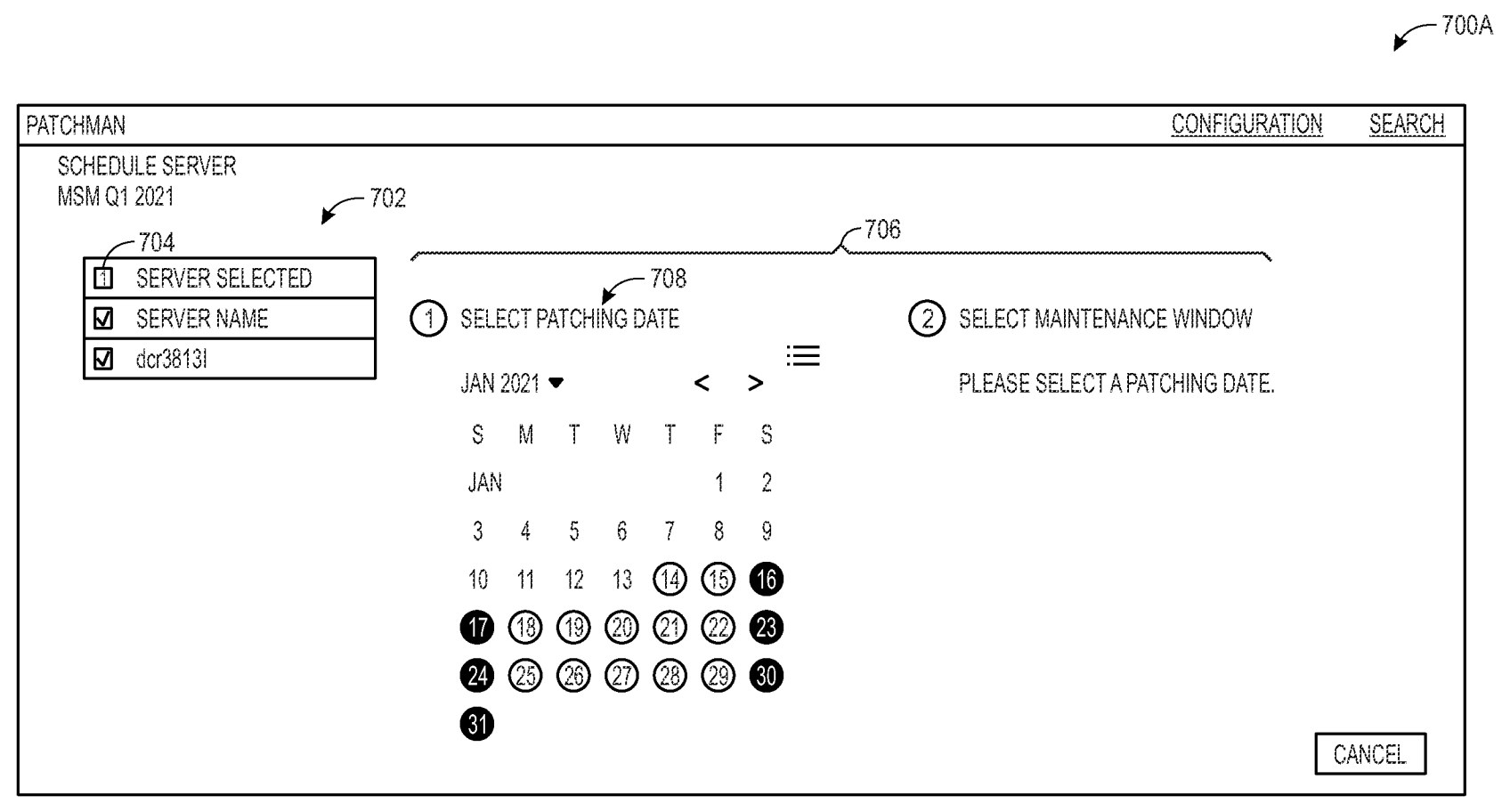
Figure 7B:
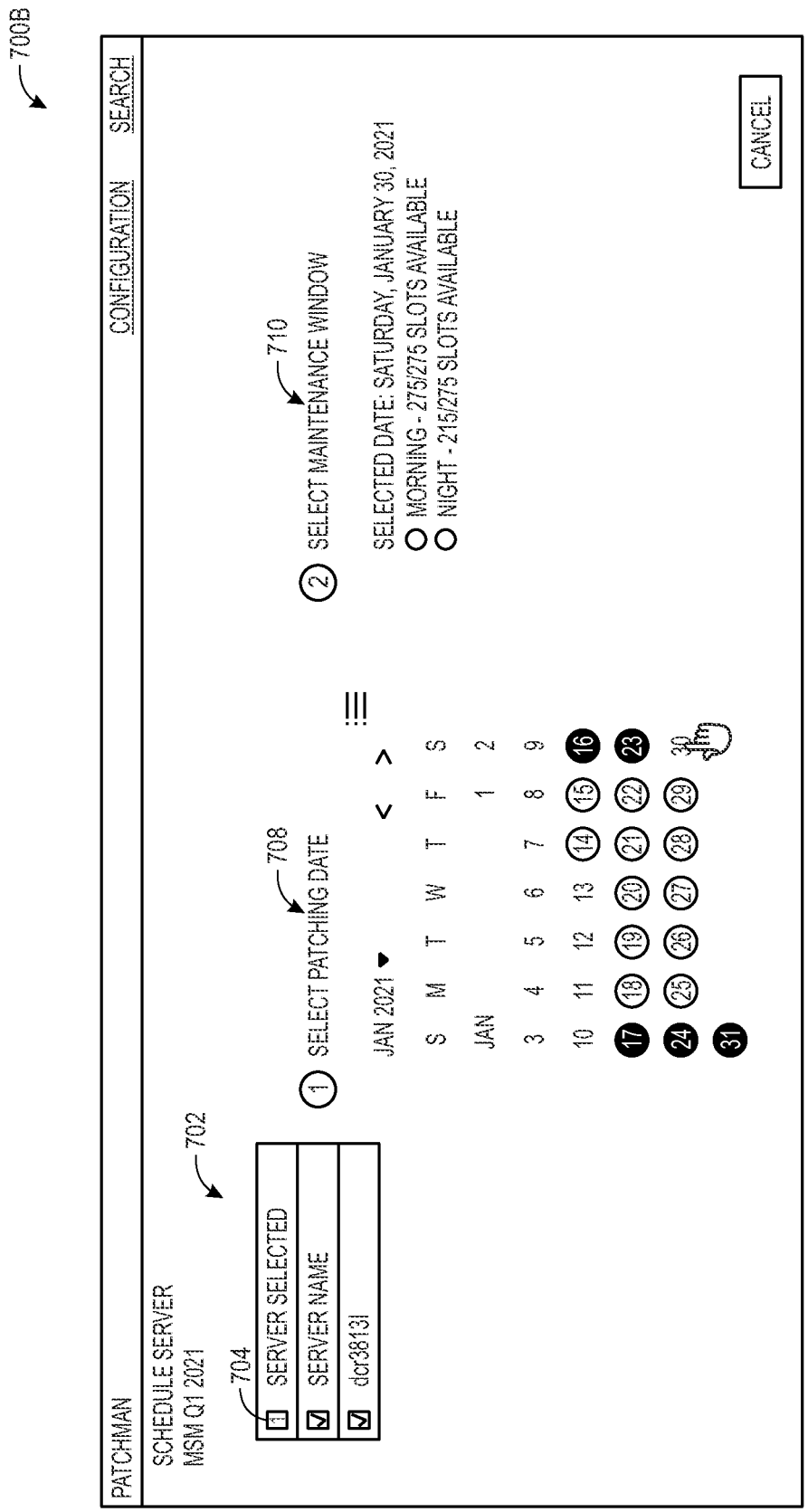
Figure 7C:
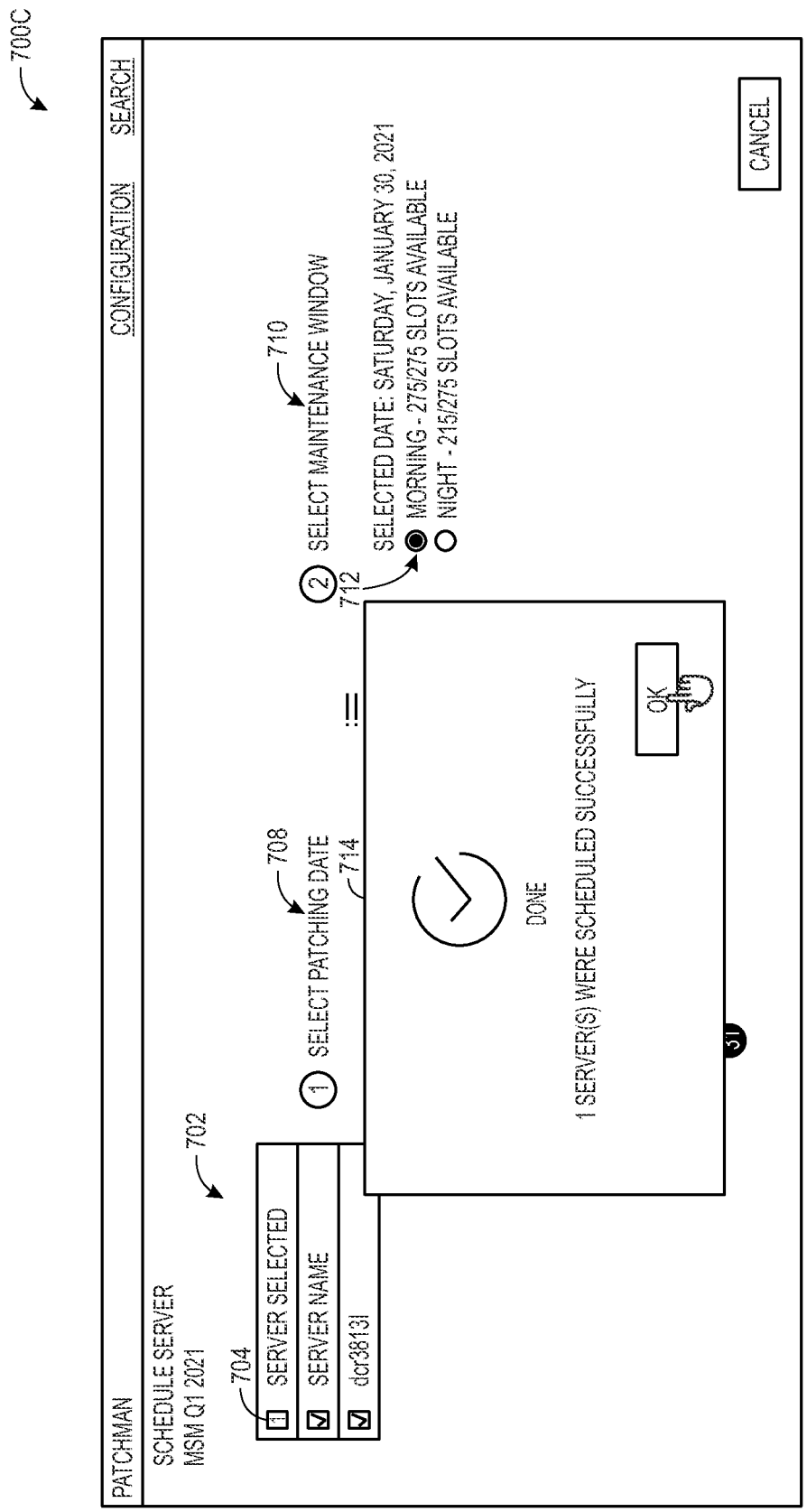

FIGS. 7A-C illustrate a progression of a GUI 700 (represented in progression as GUI 700A, 700B, and 700C) for scheduling a patch of an asset via a GUI, in accordance with certain embodiments described herein. The GUI 700A provided in FIG. 7A may be provided upon selecting the schedule affordance 600 of FIG. 6. In the GUI 700A of FIG. 7A, the selected assets of the GUI 600 are provided as the assets to be scheduled 702. Any number of assets may be selected in the GUI 600 and/or in a selection option 704 of GUI 700A. A patching window affordance 706 may also be provided, enabling a user to provide a particular patching window that should be applied to the selected assets to be scheduled 702. For example, in the current embodiment, a patching calendar affordance 708 enables a user to select a date of the patching window. As illustrated in GUI 700B of FIG. 7B, upon selecting a particular date in the patching calendar affordance 708, an affordance 710 for selecting an available maintenance window (e.g., "morning" or "night") is provided. The available maintenance windows provided in the affordance 710 may be specific to the selected date from the patching calendar affordance 708. Unavailable maintenance windows (e.g., due to maximum scheduled assets, scheduling restrictions, etc.) may be filtered out and not displayed in the affordance 710. For example, as indicated by the options of the affordance 710 there are a maximum of 275 assets that can be applied to the morning and evening maintenance windows of Jan. 30, 2021. The morning window currently has 275 remaining (meaning no assets are currently assigned to that window). The night window only has 215 of those 275 slots left. In some embodiments, if, for a particular option, no slots (or not enough slots) are available to schedule all of the selected assets to be scheduled 702, the GUI 700B may refrain from providing the particular option. In alternative embodiments, the particular option may be provided, but an error message may be displayed and the assets may be blocked from being scheduled to a window corresponding to the particular option.

As illustrated in GUI 700C of FIG. 7C, upon confirmation of a particular maintenance window 712, a confirmation dialog box 714 may be displayed. The confirmation dialog box may indicate that the selected assets to be patched 702 were successfully scheduled.

Figure 8:
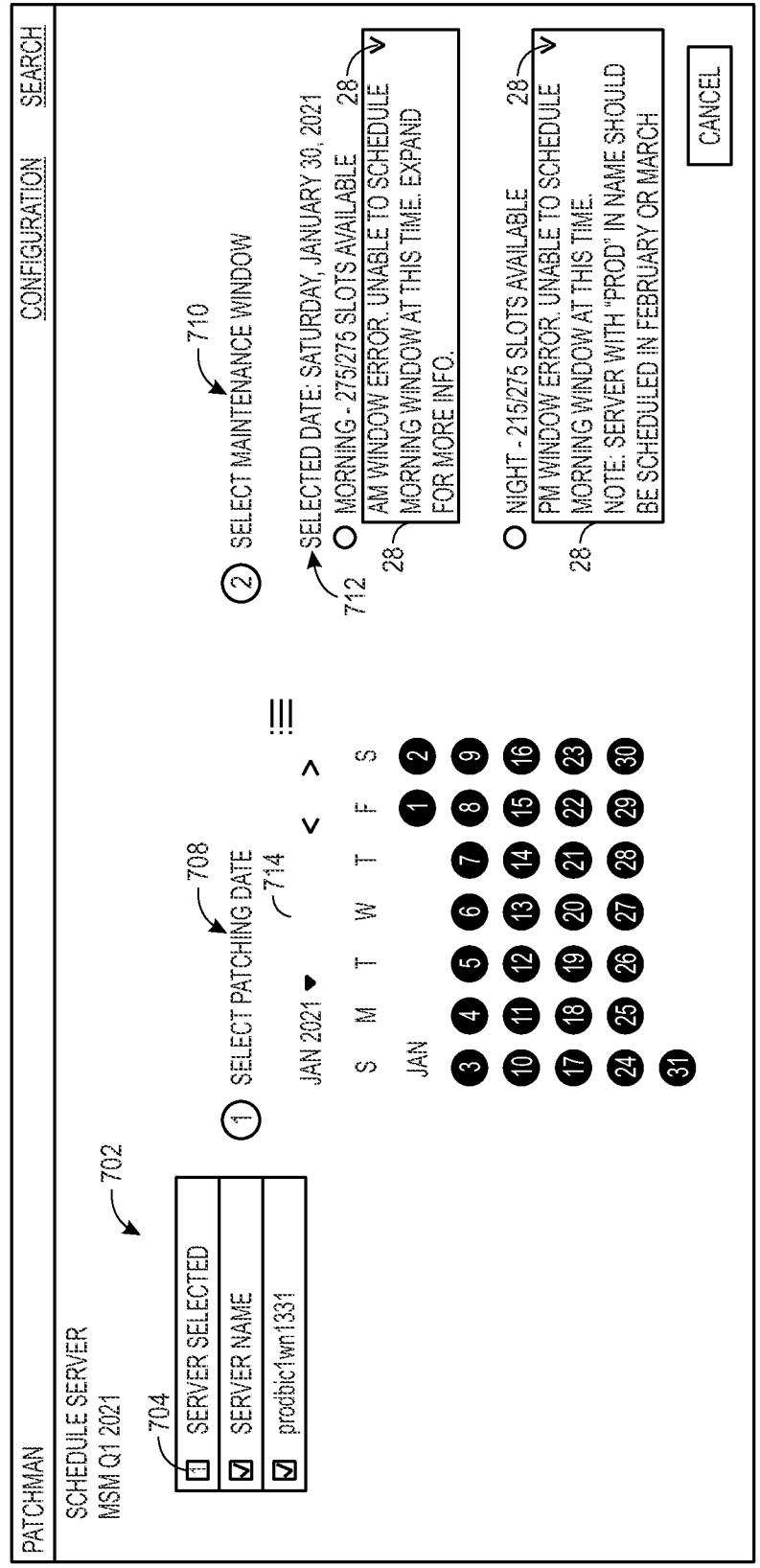
FIG. 8 illustrates a scheduling restriction for a patch of an asset, generated via a GUI, in accordance with certain embodiments described herein.

As mentioned above, patch scheduling restrictions may be imposed by asset managers and/or IT administrators. FIG. 8 illustrates a GUI 800 where a scheduling restriction for a patch of an asset is applied, in accordance with certain embodiments described herein. As an example, an IT administrator may determine that production level servers are restricted to patching during certain months (e.g., February or March). The IT organization may have a naming convention for assets where all production level servers include "PROD" in their name. Accordingly, a restriction can be established, such that all assets with "PROD" in their name cannot be scheduled for any months other than February or March. In the current example, the selected asset to be scheduled 802 is named "prodbiclwn133I", which does have "prod" in its name. Accordingly, the patch management service 202 may restrict this selected asset to be scheduled 802 to scheduling in February or March. Here, the scheduler has attempted to schedule on the selected date 804 of Jan. 30, 2021, which results in an error indication 806 on all maintenance windows for the selected date 804. The error indication 806 may provide a brief description of the error and provide an affordance 808 for further explanation. As illustrated, when the affordance 808 is selected a detailed explanation 810 is displayed (e.g., here indicating that servers with "prod" in their name must be scheduled in February or March). This enables the scheduler to quickly understand restrictions that may be applied to their assets and select approved dates/windows. While the current example illustrates a date level restriction, it is important to note that window level restrictions and combinatory level restrictions could also be used. For example, the restriction could be that assets with "prod" in their names must be patched during a morning window and/or must be patched in morning windows on weekends or night windows on weekdays.

Figure 9:
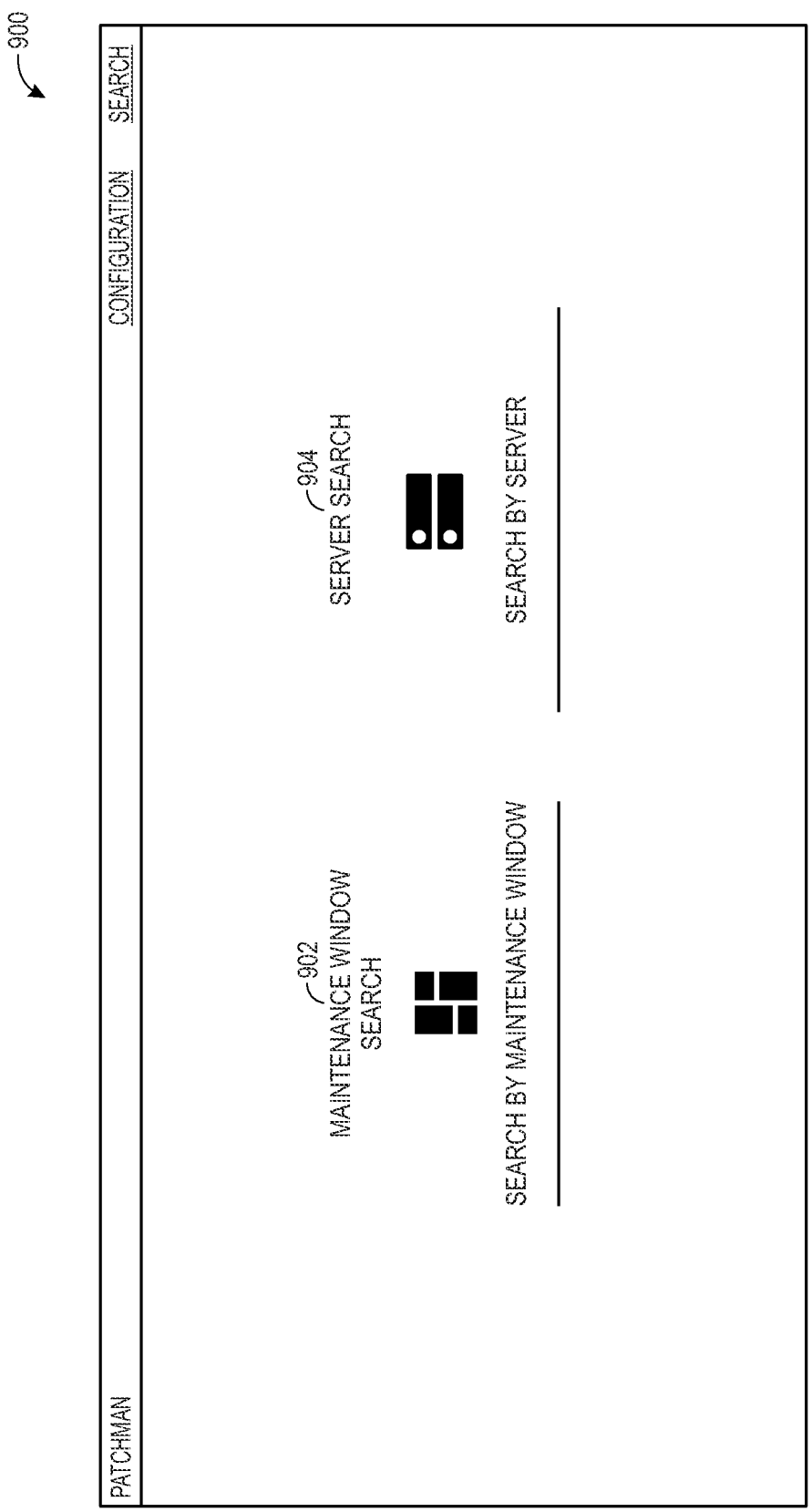
FIG. 9 illustrates a patch searching main menu provided in a GUI, in accordance with certain embodiments described herein.

It may be important to quickly search the patch schedule. FIG. 9 illustrates a patch searching main menu provided in a GUI 900, in accordance with certain embodiments described herein. As illustrated, several search options could be provided in the GUI 900. For example, here a maintenance window search affordance 902 is provided for searching for particular maintenance windows in the patching schedule. Further, a server search affordance 904 is provided for searching for a particular asset in the patching schedule.

Figure 10:
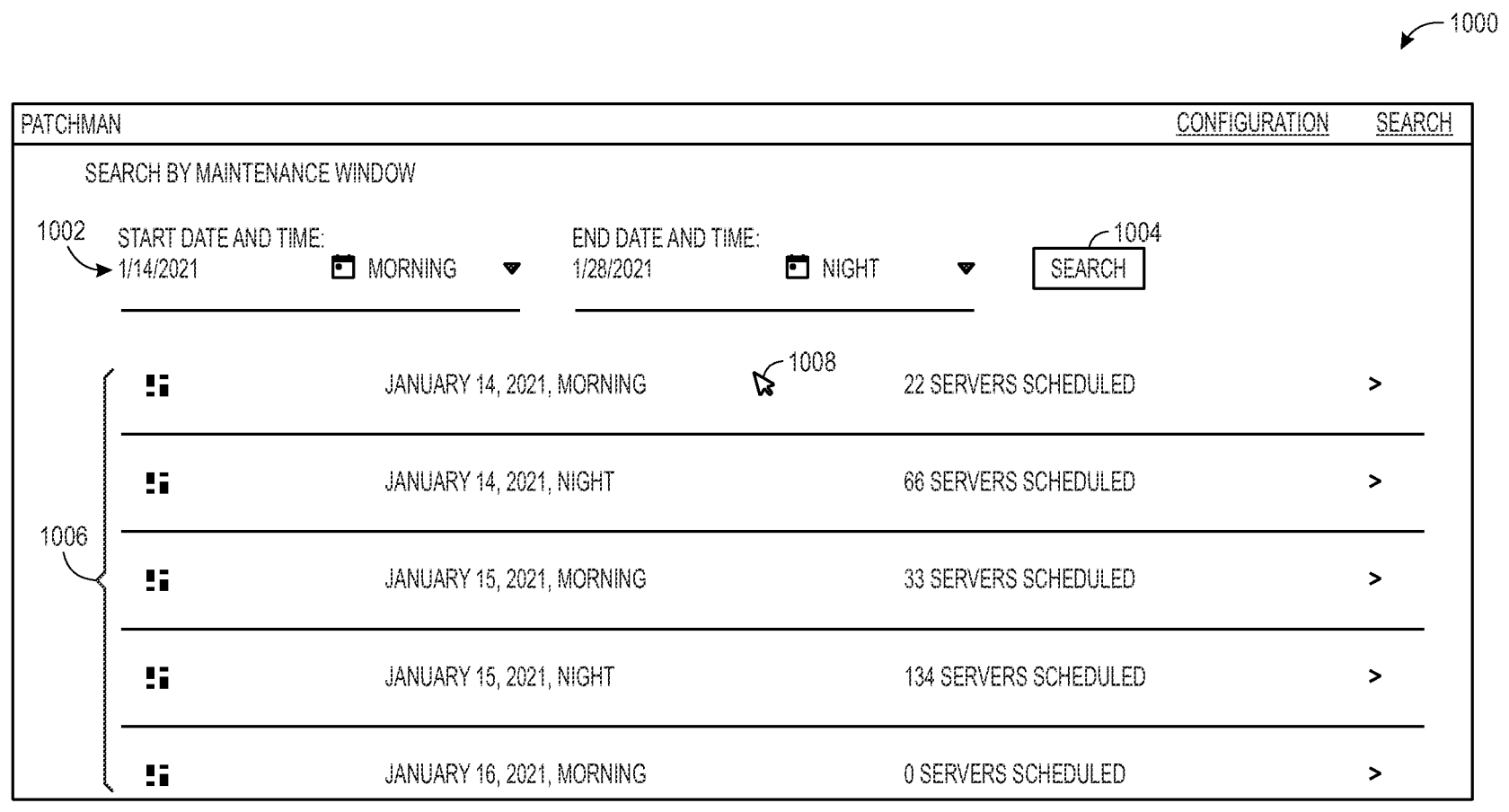

Turning to a discussion of the maintenance window search, FIG. 10 illustrates a GUI 1000 for facilitating the maintenance window search to identify patches within a particular specified maintenance window, in accordance with certain embodiments described herein. The GUI 1000 includes a date and time range affordance 1002 that enables a user to select a range of date and times to search for in the patch schedule. For example, here the user has selected to search for maintenance windows in the range of Jan. 14, 2021 morning to Jan. 28, 2021 night. Upon selecting the search affordance 1004, a selectable list 1006 of all maintenance windows within the range is provided. As illustrated, characteristics of the maintenance windows may be provided in the selectable list 1006. For example, in the current embodiment, a number of assets (e.g., servers) that are currently scheduled is provided in the selectable list 1006, providing a brief overview of the maintenance window without further interaction.

Figure 11:
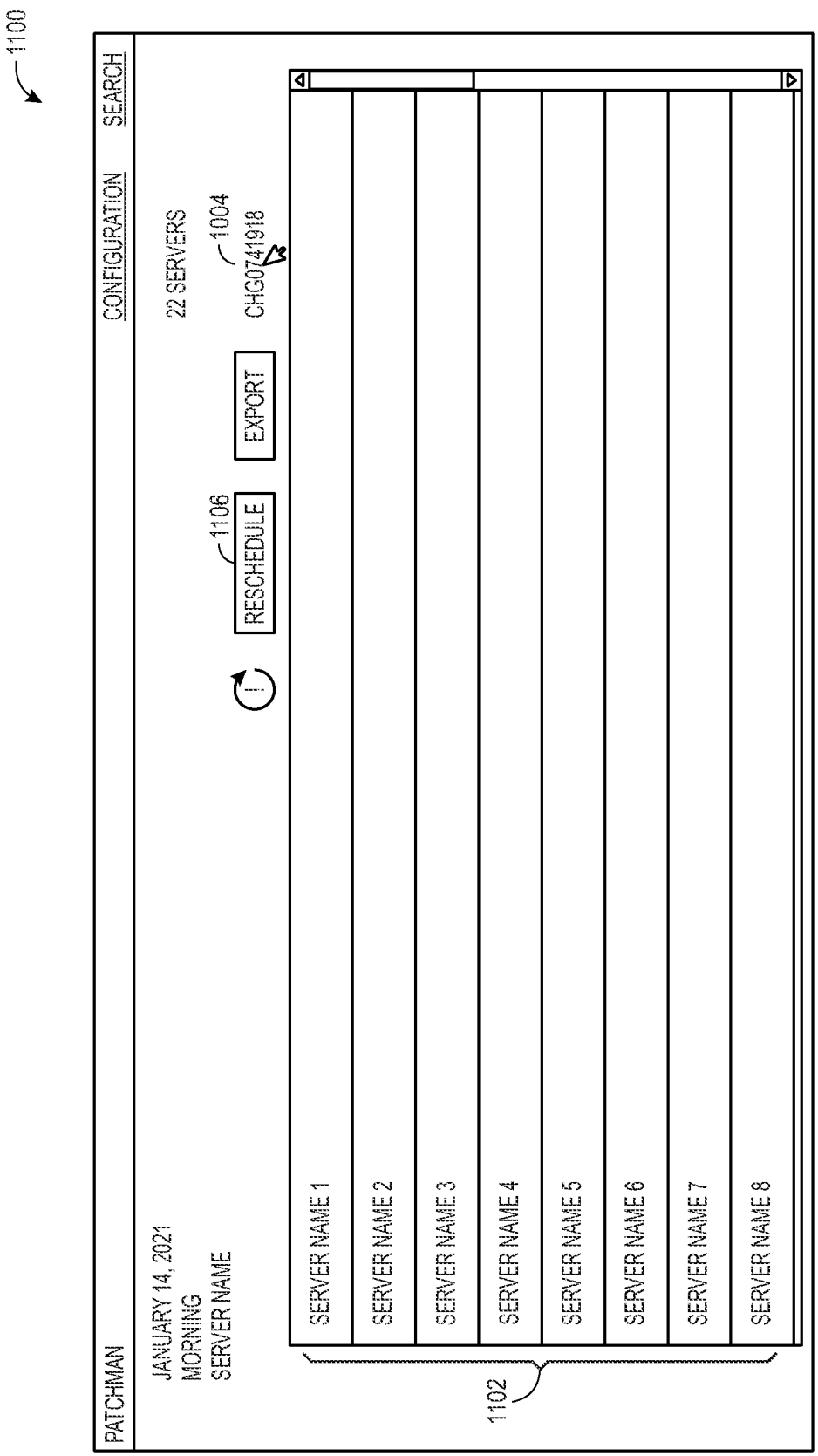
FIG. 11 illustrates a GUI that provides specific assets scheduled for a particular specified maintenance window, in accordance with certain embodiments described herein.

As indicated by icon 1008, a user may select a particular maintenance window (e.g., here the "Jan. 14, 2021, Morning" window), resulting in the GUI 1100 of FIG. 11, which provides a list 1102 of specific assets scheduled for the particular specified maintenance window (e.g., here the "Jan. 14, 2021, Morning" window), in accordance with certain embodiments described herein. As mentioned above, a change management ticket may be generated based upon the assets scheduled for a particular maintenance window. As illustrated, the GUI 1100 may provide a selectable affordance 1104 that provides a reference to the change management ticket (e.g., by displaying the change management ticket identification number). Upon selection of the affordance 1104, the change management system may be launched and the change management ticket may be provided.

Figure 12:
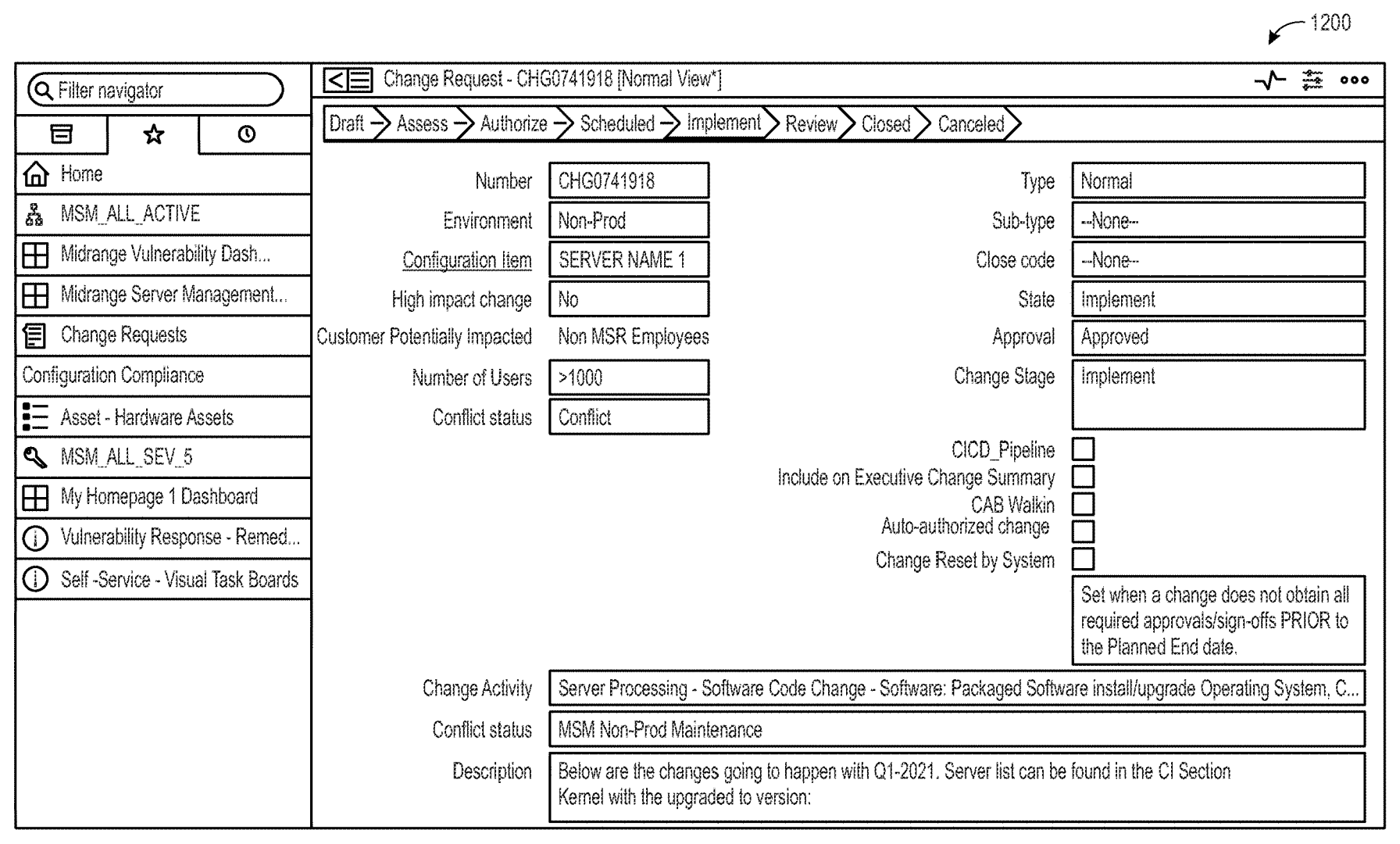

For example, FIG. 12 illustrates a GUI 1200 of a change management system, launched from the GUI of FIG. 11, illustrating a change management ticket that is generated for the particular specified maintenance window, in accordance with certain embodiments described herein. As may be appreciated, the change management system may require information in addition to the maintenance window date and time and asset identifier. For example, an environment indication may be needed, which the patch management system can derive (e.g., from the naming convention of the assets) or the change management system can derive (e.g., from the CMDB entries associated with the asset). Further, by providing the change management ticket link in the GUI 1100, a scheduler can quickly and efficiently make changes directly in the change management system, bypassing menus of the change management system.

Figure 13A:
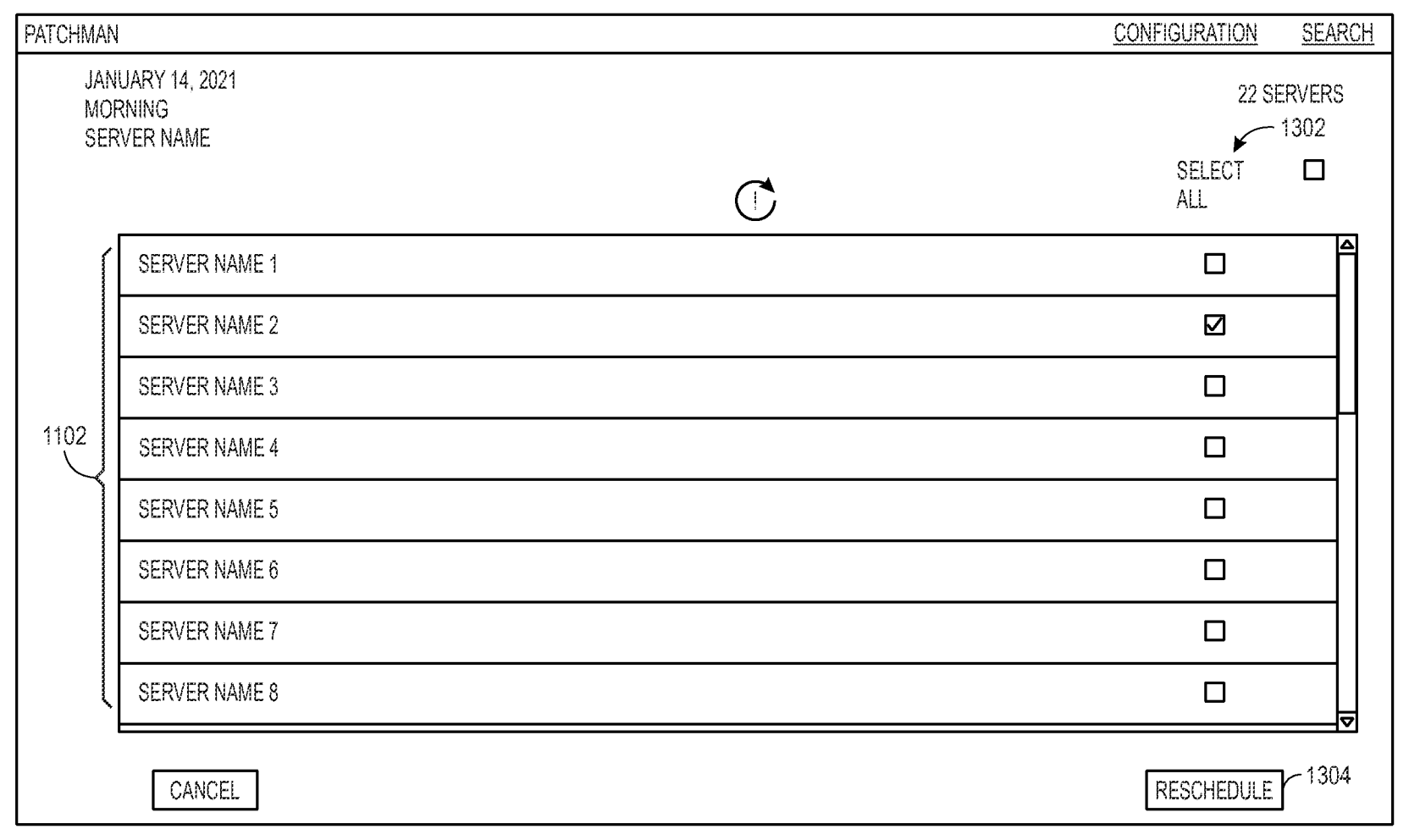
Figure 13B:
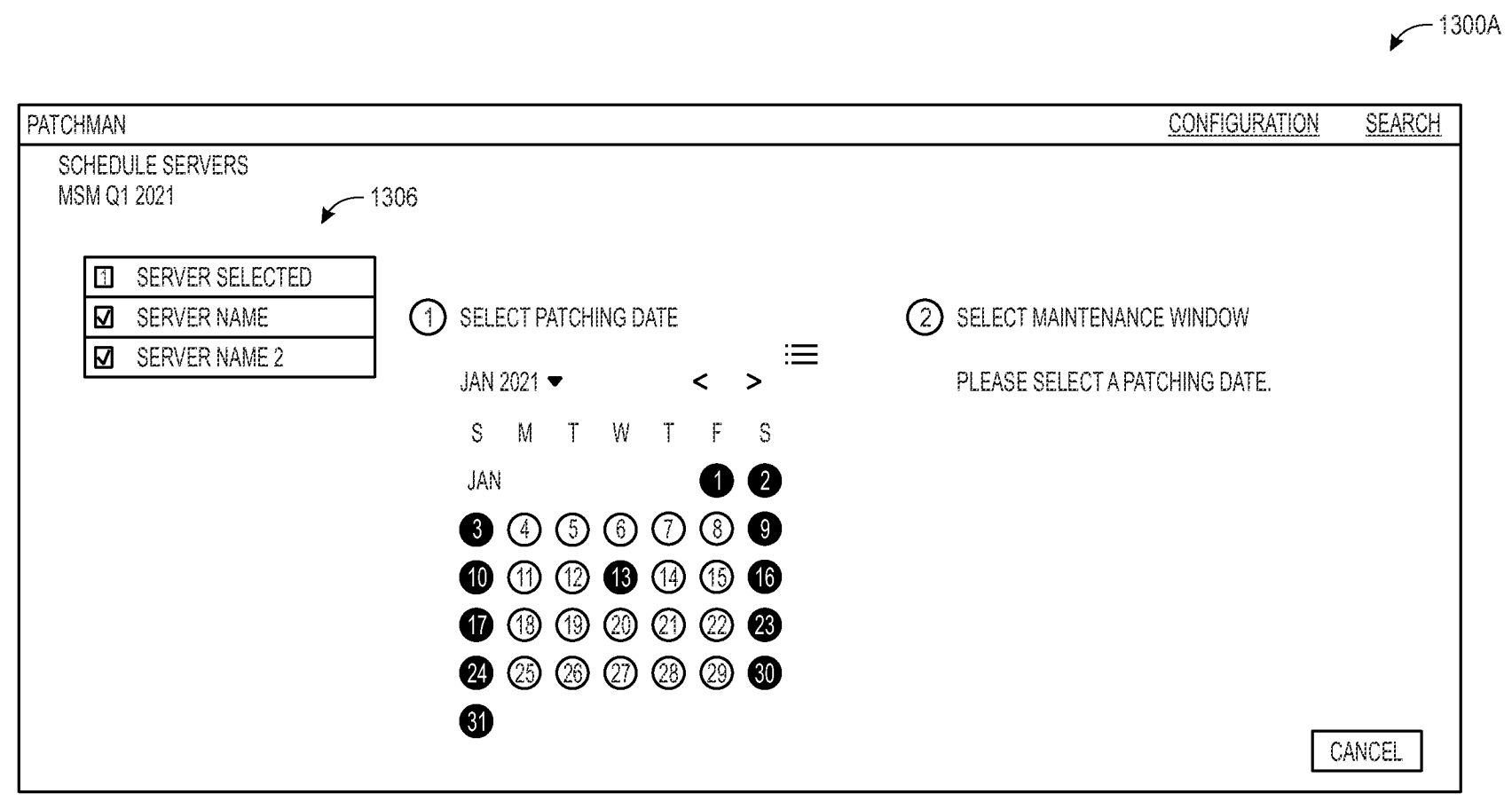

Having discussed scheduling assets for patching, FIGS. 13A and B illustrate a GUI 1300 progression (referenced as GUI 1300A and GUI 1300B) for rescheduling patching of a particular asset, in accordance with certain embodiments described herein. As illustrated in FIG. 11, a reschedule affordance 1106 is provided. When affordance 1106 is selected, GUI 1300A with asset selection affordances 1302 may be provided. Upon selecting one or more assets (e.g., here devoosauto12) and the reschedule affordance 1304, the GUI 1300B may be displayed. The GUI 1300B provides the same functionality as FIG. 7A, enabling the selected assets to be schedule 1306 to be rescheduled. Upon rescheduling, the change management ticket may be automatically modified to remove the rescheduled asset from a generated change management ticket for the previous maintenance window and also automatically modify or generate a change management ticket for the new maintenance window that the assets are scheduled for. As may be appreciated, this creates a huge efficiency, allowing administrators to bypass many GUI prompts to efficiently schedule and execute patches.

Figure 14:
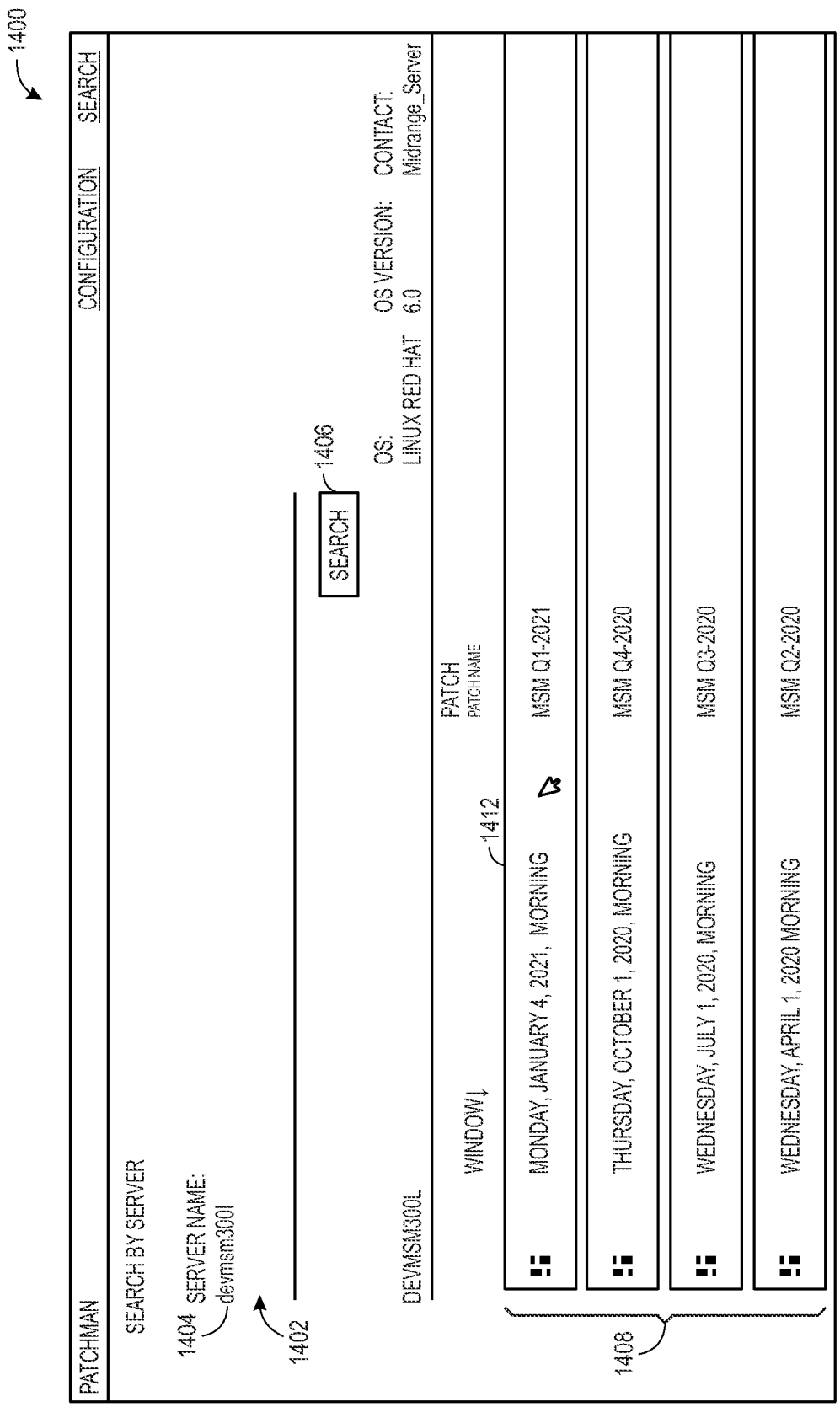
FIG. 14 illustrates a server search to identify scheduled patches that is facilitated via a GUI, in accordance with certain embodiments described herein.

Returning to FIG. 9, the server search affordance 904, when selected, may result in the GUI 1400 of FIG. 14, which facilitates a server search to identify scheduled patches, in accordance with certain embodiments described herein. As illustrated, the GUI 140 includes a search affordance 1402 where a user may input a particular asset 1404 to search for. Upon selecting the search affordance 1406, all maintenance windows where patching of the particular asset 1404 is scheduled are displayed in a selectable list 1408. For example, as illustrated by icon 1410, the user may select a particular one of the maintenance windows 1412. Selecting this particular maintenance window 1412 will result in displaying a GUI similar to the GUI 1100 of FIG. 11, where details of the maintenance window may be obtained.

From time to time, it may be desirable to skip patching of certain assets, even though the asset inventory may indicate that the assets should be patched. To do this, under some enterprise policies, an approved exception may be required to skip patching. This may be done by requesting an exception for an asset via an affordance of one of the GUIs described herein. Once the exception is requested, an exception approver may approve or deny the exception. FIG. 15 illustrates a GUI 1500 that provides an option to view pending exceptions and approved exceptions to patching during a particular patching cycle, in accordance with certain embodiments described herein. Because the pending exceptions tab 1502 is currently selected, a list 1504 of requested but not yet approved exceptions is provided. The list 1504 of pending exceptions provides an indication of the assets, a contact for the asset/exception, an identifier of the requestor of the exception and a date when the exception was requested. The schedule notes 1506 provide an indication of whether underlying notes are available to explain the exception request. When clicked, any underlying notes are displayed to the user.

Similarly, the exception to patching tab 1508 may be selected. When this tab 1508 is selected, a list of approved exceptions is provided. The list of exceptions provides an indication of the assets excepted, a contact for the asset/exception, an identifier of the requestor of the exception and a date when the exception was requested. Further, because the exception is accepted, the acceptance date and identifier of the accepter may be provided. This data allows for quick retrieval of patch scheduling exceptions, ensuring that all assets are scheduled quickly or approved for patch schedule exceptions.

FIG. 16 illustrates a GUI 1600 that provides an indication of an approved exception for patch scheduling for a particular asset, from a search by server query, in accordance with certain embodiments described herein. As illustrated, the search query results 1602 provide an indication 1604 that an exception has been approved for patching. The approver (e.g., here PLK4777) and the approval date (e.g., here Dec. 17, 2020 8:48 AM) is provided as well. Further, as illustrated, the exception has resulted in the asset being excluded from maintenance windows for each of the available patching cycles after the exception was approved. As may be appreciated, in some embodiments exceptions could occur for only one cycle, while in other embodiments the exception may apply to all cycles until the exception either: expires (e.g., based upon an exception approved until due date) or is manually or automatically withdrawn (e.g., when an administrator manually deletes the exception or a certain default time period is reached where the exception is automatically deleted).

While only certain features of present embodiments have been illustrated and described herein, many modifications and changes will occur to those skilled in the art. It is, therefore, to be understood that the appended claims are intended to cover all such modifications and changes that fall within the true spirit of the disclosure. Further, it should be understood that certain elements of the disclosed embodiments may be combined or exchanged with one another.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An automated electronic device patching system, comprising:
  one or more electronic device assets to be patched;
  a patch management service, configured to:
    obtain a list of the electronic device assets to be patched;
    provide a scheduling graphical user interface (GUI) comprising one or more scheduling affordances to receive one or more maintenance windows to schedule patching of the electronic device assets in; and
    receive, via the scheduling GUI, an indication of the one or more maintenance windows to schedule patching of the electronic device assets in;
  a tag scripting engine, different than the patch management service, configured to:
    receive, from the patch management service, the indication of the one or more maintenance windows to schedule patching of the electronic device assets in;
    in response to receiving the indication of the one or more maintenance windows to schedule patching of the electronic device assets in, apply patching tags to each of the electronic device assets to be patched, by causing storage of the patching tags at the electronic device assets to be patched, the patching tags providing an indication of a particular maintenance window associated with a corresponding electronic device asset, as indicated by the indication of the one or more maintenance windows to schedule patching of the electronic device assets in; and
  a patch implementation system, different than the patch management service and the tag scripting engine, configured to:
    receive a patch deployment schedule from the tag scripting engine; and
    deploy patches to the electronic device assets in accordance with the patch deployment schedule, by:
      identifying a maintenance window to be implemented and an associated patching tag for the maintenance window; and providing, to the electronic device assets to be patched, a patching script configured to determine that the corresponding electronic device asset has the associated patching tag, causing patching of the electronic device asset only if the electronic device asset has a patching tag that matches the associated patching tag.

2. The automated electronic device patching system of claim 1, comprising a configuration management database (CMDB), wherein the patch management service obtains the list of the electronic device assets to be patched based at least in part upon an asset inventory in the CMDB.

3. The automated electronic device patching system of claim 1, comprising a change management system configured to: track change management requests via change management tickets; and
wherein the patch management service is configured to generate a change management ticket corresponding to the indication of the one or more maintenance windows to schedule patching of the electronic device assets in.

4. The automated electronic device patching system of claim 1, comprising a patch scanning system configured to verify the deployment of the patches to the electronic device assets.

5. The automated electronic device patching system of claim 1, wherein the patch management service is configured to:
provide a schedule recommendation for patching the electronic device assets based upon a previous patching schedule of the electronic device assets.

6. The automated electronic device patching system of claim 1, wherein the scheduling GUI comprises a list of a subset of the electronic device assets that have not been scheduled.

7. The automated electronic device patching system of claim 1, wherein the patch management service is configured to:
identify one or more scheduling restrictions; and
enable scheduling of the electronic device assets in accordance with the scheduling restrictions.

8. The automated electronic device patching system of claim 7, wherein the scheduling restrictions apply a limitation to available maintenance windows based upon a characteristic of the electronic device assets.

9. The automated electronic device patching system of claim 8, wherein the characteristic comprises a name of the electronic device assets comprising a particular prescribed string of characters.

10. The automated electronic device patching system of claim 7, wherein the scheduling restrictions apply a maximum number of electronic device assets that can be patched during a particular maintenance window.

11. The automated electronic device patching system of claim 1, wherein the patch management service is configured to facilitate a maintenance window search that provides maintenance window results comprising all scheduled maintenance windows within a specified date, time, or date and time range.

12. The automated electronic device patching system of claim 11, wherein the maintenance window results comprise a link to a change management ticket in a change management system that, when selected, provides direct navigation to the change management ticket in the change management system, bypassing other GUIs of the change management system, wherein the change management ticket is associated with the maintenance window results.

13. The automated electronic device patching system of claim 1, wherein the patch management service is configured to facilitate an asset search that provides maintenance window results comprising all scheduled maintenance windows where a specified asset is scheduled for patching.

14. The automated electronic device patching system of claim 13, wherein the maintenance window results comprise a link to a change management ticket in a change management system that, when selected, provides direct navigation to the change management ticket in the change management system, bypassing other GUIs of the change management system, wherein the change management ticket is associated with the maintenance window results.

15. A tangible, non-transitory, computer-readable medium, comprising computer-readable instructions that, when executed by one or more processors of a computer, cause the computer to:
obtain, via a patch management service, a list of electronic device assets to be patched;
provide, via the patch management service, a scheduling graphical user interface (GUI) comprising one or more scheduling affordances to receive one or more maintenance windows to schedule patching of the electronic device assets in; and
receive, via the scheduling GUI, an indication of the one or more maintenance windows to schedule patching of the electronic device assets in;
provide to a tag scripting engine different than the patch management service the indication of the one or more maintenance windows to schedule patching of the electronic device assets in, to cause the tag scripting engine to, in response to receiving the indication of the one or more maintenance windows to schedule patching of the electronic device assets in, apply patching tags to each of the electronic device assets to be patched, by causing storage of the patching tags at the electronic device assets to be patched, the patching tags providing an indication of a particular maintenance window associated with a corresponding electronic device asset, as indicated by the indication of the one or more maintenance windows to schedule patching of the electronic device assets in;
wherein the patching tags enable a patch implementation system different than the patch management service and the tag scripting engine, to:
receive a patch deployment schedule from the tag scripting engine; and
deploy patches to the electronic device assets in accordance with the patch deployment schedule, by:
identifying a maintenance window to be implemented and an associated patching tag for the maintenance window; and
providing, to the electronic device assets to be patched, a patching script configured to determine that the corresponding electronic device asset has the associated patching, causing patching of the electronic device asset only if the electronic device asset has a patching tag that matches the associated patching tag.

16. The tangible, non-transitory, computer-readable medium of claim 15, comprising computer-readable instructions that, when executed by one or more processors of a computer, cause the computer to:
identify one or more scheduling restrictions; and
enable scheduling of the electronic device assets in accordance with the scheduling restrictions.

17. The tangible, non-transitory, computer-readable medium of claim 16, wherein the scheduling restrictions apply a limitation to available maintenance windows based upon a characteristic of the electronic device assets; and
    wherein the characteristic comprises a name of the electronic device assets comprising a particular prescribed string of characters.

18. The tangible, non-transitory, computer-readable medium of claim 15, comprising computer-readable instructions that, when executed by one or more processors of a computer, cause the computer to:
    cause generation, via a change management system, a change management ticket corresponding to the indication of the one or more maintenance windows to schedule patching of the electronic device assets in.

19. A method, comprising:
    obtaining, via a patch management service, a list of electronic device assets to be patched;
    provide, via the patch management service, a scheduling graphical user interface (GUI) comprising one or more scheduling affordances to receive one or more maintenance windows to schedule patching of the electronic device assets in;
    receiving, via the scheduling GUI, an indication of the one or more maintenance windows to schedule patching of the electronic device assets in;
    provide, from the patch management service, to a tag scripting service different than the patch management service, the indication of the one or more maintenance windows to schedule patching of the electronic device assets in, causing the tag scripting service to, in response to receiving the indication of the one or more maintenance windows to schedule patching of the electronic device assets in, apply patching tags to each of the electronic device assets to be patched, by causing storage of the patching tags at the electronic device assets to be patched, the patching tags providing an indication of a particular maintenance window associated with a corresponding electronic device asset, as indicated by the indication of the one or more maintenance windows to schedule patching of the electronic device assets in;
    wherein the patching tags enable a patch implementation system different than the patch management service and the tag scripting engine, to:
        receive a patch deployment schedule from the tag scripting engine; and
        deploy patches to the electronic device assets in accordance with the patch deployment schedule, by:
            identifying a maintenance window to be implemented and an associated patching tag for the maintenance window; and
            providing, to the electronic device assets to be patched, a patching script configured to determine that the corresponding electronic device asset has the associated patching tag, causing patching of the electronic device asset only if the electronic device asset has a patching tag that matches the associated patching tag.

20. The method of claim 19, comprising:
identifying one or more scheduling restrictions; and
enabling scheduling of the electronic device assets in accordance with the scheduling restrictions.

\* \* \* \* \*